United States Patent Office 2,769,019
Patented Oct. 30, 1956

2,769,019

9-DEHYDROTESTOSTERONE AND 9-DEHYDRO-NORTESTOSTERONE AND ESTERS THEREOF

Milton E. Herr, Kalamazoo Township, Kalamazoo County, and Frederick W. Heyl, Kalamazoo City, Mich., assignors to The Upjohn Company, Kalamazoo, Mich., a corporation of Michigan No Drawing. Application July 9, 1953,
Serial No. 367,105

10 Claims. (Cl. 260—397.45)

The present invention pertains to steroid compounds related to testosterone, and is more particularly concerned with novel 9-dehydrotestosterone and 10-normethyl-9-dehydrotestosterone, and 17-acylates thereof.

The novel compounds of the present invention may be represented by the following formula:

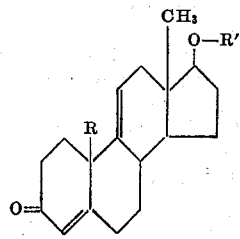

wherein R is selected from the group consisting of hydrogen and methyl, and R' is selected from the group consisting of hydrogen and the acyl radical of an organic carboxylic acid. Of particular interest are the compounds wherein R' is hydrogen and the acyl radical of a hydrocarbon carboxylic acid containing from one to eight carbon atoms, inclusive, the preferred carboxylic acids being the alkanoates, cycloalkylalkanoates, and benzoates.

It is an object of this invention to provide the novel 9-dehydrotestosterone and 10-normethyl-9-dehydrotestosterone. Another object of this invention to to provide the novel 17-acylates of 9-dehydrotestosterone and 10-normethyl-9-dehydrotestosterone. Other objects would be apparent to one skilled in the art.

The compounds of the present invention have interesting and important physiological properties, their androgenic and anabolic activity being among the most important. These compounds also are useful in the preparation of other physiologically active compounds, e. g., selective reduction of the 4-double bond of 9-dehydrotestosterone or a 17-acylate thereof, with hydrogen and a catalyst, such as palladium-charcoal, followed by acidic or basic hydrolysis of the 17-acylate radical, if present, and then oxidation of the 17-hydroxy group to a keto group using an agent such as chromic acid, produces 9-androstene-3,17-dione [Shoppee, J. Chem. Soc., 1134 (1946)], or, if the 3-keto group is also reduced to a hydroxy group, for example, with platinum and hydrogen, or a chemical reducing agent, 9-androstene-3α-ol-17-one and the isomeric 9-etiocholene-3α-ol-17-one, which have been isolated from urine [Lieberman et al., J. Biol. Chem., 172, 263 (1948)], are obtained. The 17-acylate compounds of the present invention are also useful in the purification of the parent hydroxy compounds, which may be recovered in purified form by hydrolysis of the 17-acylate. Other uses of the compounds of the present invention will be apparent to one skilled in the art to which this invention pertains.

9-dehydrotestosterone and 10-normethyl-9-dehydrotestosterone are prepared by dehydration of 11-β-hydroxytestosterone and 11β-hydroxy-10-normethyltestosterone, respectively, the starting hydroxytestosterones being prepared according to the procedure of our copending application, Serial No. 331,494, filed January 15, 1953. The dehydration of the hydroxytestosterones may be carried out by the novel process shown in the examples, or by prior art procedure for dehydration of 11β-hydroxysteroids, e. g. [Fieser and Fieser, "Natural Products Related to Phenanthrene," Reinhold Publishing Corporation, New York, New York, 1949, pages 408–409]. The 17-acylates of 9-dehydrotestosterone and 10-normethyl-9-dehydrotestosterone are prepared by esterification using an acylating agent such as, for example, an acid, acid anhydride, acid halide, ester of an acid with a lower alcohol, ketene, etc., according to prior art procedure for converting an alcoholic hydroxyl group to an ester, the isolation and purification also being conducted by conventional procedure.

The following examples are illustrative of the products of the present invention, but are not to be construed as limiting.

Example 1.—9-dehydrotestosterone

A two-phase mixture of 2.50 grams of 11β-hydroxytestosterone, 250 milliliters of benzene, 200 milliliters of ether, 100 milliliters of concentrated hydrochloric acid, and 100 milliliters of water is heated under reflux for eighteen hours with vigorous stirring. After cooling, the two layers are separated and the aqueous layer is extracted three times with 75-milliliter portions of ether. The ether extracts are combined with the benzene-ether layer, and the resulting solution is washed with dilute aqueous potassium carbonate solution and with water. The washed solution is dried over anhydrous sodium sulfate; and, after removal of the drying agent, the solvent is evaporated. The semi-crystalline residue weighs 2.1 grams and is recrystallized from a mixture of methylene chloride and normal-hexane (boiling at 60 to 71 degrees centigrade, Skellysolve B) to provide pure 9-dehydrotestosterone; yield 1.80 grams or 77 percent of the theoretical amount; $[\alpha]_D^{23}$ plus 89 degrees in chloroform; melting point 153 to 154 degrees centigrade.

Analysis.—Calculated for $C_{19}H_{26}O_2$: C, 79.68; H, 9.15. Found: C, 79.93; H, 9.10.

Example 2.—10-normethyl-9-dehydrotestosterone

In exactly the same manner as shown in Example 1, except that 11β-hydroxy-10-normethyltestosterone is used in place of 11β-hydroxytestosterone, 10-normethyl-9-dehydrotestosterone is obtained. Purification by conventional procedure gives 10-normethyl-9-dehydrotestosterone of high purity.

Example 3.—9-dehydrotestosterone 17-propionate

A mixture of 0.3 gram of 9-dehydrotestosterone, two milliliters of dry pyridine, and two milliliters of propionic anhydride is maintained at a temperature of about 26 degrees centigrade for 22 hours. The mixture is then poured into 25 milliliters of water and stirred for two hours at about 26 degrees centigrade. The crystalline 9-dehydrotestosterone 17-propionate obtained is recovered by filtration, washed with water, and dried; yield 0.34 gram; melting point 114 degrees centigrade; $[\alpha]_D^{23}$ plus 63 degrees in chloroform.

Analysis.—Calculated for $C_{22}H_{30}O_3$: C, 77.14; H, 8.83. Found: C, 77.22; H, 8.93.

Example 4.—9-dehydrotestosterone 17-trimethylacetate

Trimethylacetyl chloride is substituted for the propionic anhydride in the procedure of Example 3 to obtain 9-dehydrotestosterone 17-trimethylacetate.

In the same manner as shown in Examples 3 and 4 other 9-dehydrotestosterone 17-alkanoates are prepared from 9-dehydrotestosterone and the appropriate acylating agent, including the 17-formate, acetate, butyrate, isobutyrate, pentanoates, hexanoates, heptanoates, octanoates, and the like.

*Example 5.—10-normethyl-9-dehydrotestosterone 17-propionate*

A solution of 10-normethyl-9-dehydrotestosterone in dry pyridine is treated with propionic anhydride, in the same manner as shown in Example 3, to produce 10-normethyl-9-dehydrotestosterone 17-propionate.

*Example 6.—10-normethyl-9-dehydrotestosterone 17-trimethylacetate*

According to the procedure shown in Example 4, but substituting 10-normethyl-9-dehydrotestosterone for the 9-dehydrotestosterone, provides 10-normethyl-9-dehydrotestosterone 17-trimethylacetate.

In the same manner as shown in Examples 5 and 6, other 10-normethyl-9-dehydrotestosterone 17-alkanoates are prepared from 10-normethyl-9-dehydrotestosterone and the appropriate acylating agent including the 17-formate, acetate, butyrate, isobutyrate, pentanoate, isopentanoate, hexanoates, heptanoates, octanoates, and other 17-alkanoates.

*Example 7.—9-dehydrotestosterone 17-benzoate*

A solution of 250 milligrams of 9-dehydrotestosterone in thirty milliliters of benzene is prepared, and eighteen milliliters of benzene is distilled to dry the solution. After cooling, the dried solution is treated with 0.32 milliliter of dry pyridine and 0.32 milliliter of benzoyl chloride and maintained at a temperature of about 26 degrees centigrade for five hours, during which time pyridine hydrochloride precipitates from the solution. The mixture is treated with 25 milliliters of water and extracted with ether. The ether extract is washed with dilute aqueous hydrochloric acid and then with dilute aqueous sodium hydroxide solution, followed by water. The solution is dried over anhydrous sodium sulfate, and, after removing the drying agent, the solvent is evaporated in vacuo. The residue is crystallized from absolute methanol to yield 270 milligrams of 9-dehydrotestosterone 17-benzoate; melting point 175 to 177 degrees centigrade; $[\alpha]_D^{23}$ plus 113 degrees in chloroform.

*Analysis.*—Calculated for $C_{26}H_{30}O_3$: C, 79.96; H, 7.74. Found: C, 79.73; H, 7.63.

In the same manner other 9-dehydrotestosterone 17-benzoates are prepared, including the ortho, meta, and para 17-toluates, dimethylbenzoates, and other 17-benzoates.

*Example 8.—10-normethyl-9-dehydrotestosterone 17-benzoate*

Substituting a solution of 10-normethyl-9-dehydrotestosterone in dry benzene for the like solution of 9-dehydrotestosterone, and treating with dry pyridine and benzoyl chloride at about room temperature for five hours, as in Example 7, provides 10-normethyl-9-dehydrotestosterone 17-benzoate.

In the same manner other 10-normethyl-9-dehydrotestosterone 17-benzoates are prepared including the 17-methylbenzoates, dimethylbenzoates, and the like.

*Example 9.—9-dehydrotestosterone 17-(β-cyclopentylpropionate)*

A solution of 250 milligrams of 9-dehydrotestosterone in 25 milliliters of benzene is prepared and dried by distilling twelve milliliters of benzene from the solution. After cooling, the solution is treated with 0.25 milliliter of dry pyridine and 0.25 milliliter of β-cyclopentylpropionyl chloride and is maintained at about 26 degrees centigrade for five hours, during which time pyridine hydrochloride separates. The resulting mixture is treated with twenty milliliters of water and then extracted with ether. After washing the ether extract with dilute aqueous hydrochloric acid, dilute aqueous sodium hydroxide, and water, it is dried over anhydrous sodium sulfate. After removal of the drying agent, the solvent is evaporated to give a semicrystalline residue. Crystallization of this residue from dilute aqueous methanol gives 255 milligrams of 9-dehydrotestosterone 17-(β-cyclopentylpropionate) as needles; melting point 96 degrees centigrade; $[\alpha]_D^{23}$ plus 58 degrees in chloroform.

*Analysis.*—Calculated for $C_{27}H_{38}O_3$: C, 78.98; H, 9.33. Found: C, 78.94; H, 9.21.

In the same manner the appropriate acylating agent and 9-dehydrotestosterone provide other similar 17-cycloalkylalkanoates of 9-dehydrotestosterone, including the 17-cyclopentylformate, cyclohexylformate, cyclopentylacetate, cyclobutylformate, α-cyclopentylpropionate, cyclohexylacetate, cyclopropylformate, cycloheptylformate, (β - methylcyclopentyl)-acetate, β - cyclobutylpropionate, and other 17-cycloalkylalkanoates.

*Example 10.—10-normethyl-9-dehydrotestosterone 17-(β-cyclopentylpropionate)*

Following the procedure of Example 9, a solution of 10-normethyl-9-dehydrotestosterone in dry benzene is treated with dry pyridine and β-cyclopentylpropionyl chloride and then maintained at about room temperature for about five hours to provide 10-normethyl-9-dehydrotestosterone 17-(β-cyclopentylpropionate).

In the same manner the appropriate acylating agent and 10-normethyl-9-dehydrotestosterone provide other similar 17-cycloalkylalkanoates of 10-normethyl-9-dehydrotestosterone, including the 17-cyclopentylformate, cyclohexylformate, cyclopentylacetate, α-cyclopentylpropionate, cyclopropylformate, β-(methylcyclopentyl)-acetate, and other 17-cycloalkylalkanoates.

Examples of other 17-acylates of 9-dehydrotestosterone and 10-normethyl-9-dehydrotestosterone of the present invention include the 17-phenylacetate, pentenoates, acrylate, methacrylate, and other 17-acylates.

It is to be understood that the invention is no to be limited to the exact details of operation or exact compounds shown and described, as obvious modifications and equivalents will be apparent to one skilled in the art, and the invention is therefore to be limited only by the scope of the appended claims.

We claim:

1. A 9-dehydrotestosterone of the formula:

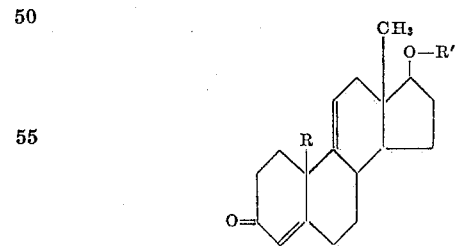

wherein R is selected from the group consisting of hydrogen and methyl and R' is selected from the group consisting of hydrogen and the acyl radical of a hydrocarbon carboxylic acid containing from one to eight carbon atoms, inclusive.

2. 9-dehydrotestosterone.

3. 10-normethyl-9-dehydrotestosterone.

4. 9-dehydrotestosterone 17-acylate wherein the acylate radical is of the formula AcO, Ac being the acyl radical of a hydrocarbon carboxylic acid containing from one to eight carbon atoms, inclusive.

5. 9-dehydrotestosterone 17-alkanoate wherein the alkanoate radical contains from one to eight carbon atoms, inclusive.

6. 9-dehydrotestosterone 17-propionate.
7. 9 - dehydrotestosterone 17 - cycloalkylalkanoate wherein the cycloalkylalkanoate radical contains from one to eight carbon atoms, inclusive.
8. 9-dehydrotestosterone 17-($\beta$-cyclopentylpropionate).
9. 10-normethyl-9-dehydrotestosterone 17-cycloalkylalkanoate wherein the cycloalkylalkanoate radical contains from one to eight carbon atoms, inclusive.
10. 10 - normethyl - 9 - dehydrotestosterone 17 - ($\beta$ - cyclopentylpropionate).

References Cited in the file of this patent

Meystre et al.: Helv. Chim. Acta 32, 1978–92 (1949).